(12) United States Patent
Chopra et al.

(10) Patent No.: US 10,642,633 B1
(45) Date of Patent: May 5, 2020

(54) INTELLIGENT BACKUPS WITH DYNAMIC PROXY IN VIRTUALIZED ENVIRONMENT

(71) Applicant: EMC Corporation, Hopkinton, MA (US)

(72) Inventors: Shelesh Chopra, Bangalore (IN); Vladimir Mandic, San Jose, CA (US); Michael Jones, Lake Stevens, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 14/869,787

(22) Filed: Sep. 29, 2015

(51) Int. Cl.
*G06F 9/455* (2018.01)
*G06F 11/14* (2006.01)

(52) U.S. Cl.
CPC ...... *G06F 9/45533* (2013.01); *G06F 9/45558* (2013.01); *G06F 11/1451* (2013.01); *G06F 11/1464* (2013.01); *G06F 2009/45595* (2013.01); *G06F 2201/815* (2013.01)

(58) Field of Classification Search
CPC .... G06F 9/45558; G06F 9/5005; G06F 9/505; G06F 9/5044; G06F 9/5083; G06F 11/1464
See application file for complete search history.

(56) References Cited

U.S. PATENT DOCUMENTS

| | | | | |
|---|---|---|---|---|
| 7,904,681 B1* | 3/2011 | Bappe | .................... | G06F 3/0617 711/149 |
| 8,782,008 B1* | 7/2014 | Xing | ................. | G06F 17/30575 707/660 |
| 8,925,092 B1* | 12/2014 | Johansson | ........... | H04L 63/1433 726/25 |
| 9,225,661 B1* | 12/2015 | Yang | ...................... | G06F 9/5077 |
| 9,684,561 B1* | 6/2017 | Yan | ......................... | G06F 16/27 |
| 2003/0058277 A1* | 3/2003 | Bowman-Amuah | ....................... | G06F 17/30607 715/765 |
| 2005/0060356 A1* | 3/2005 | Saika | .................. | G06F 11/1451 |
| 2006/0070060 A1* | 3/2006 | Tantawi | .................. | G06F 9/505 717/174 |
| 2006/0075103 A1* | 4/2006 | Cromer | .................. | G06Q 10/10 709/225 |

(Continued)

*Primary Examiner* — Emerson C Puente
*Assistant Examiner* — Zhi Chen
(74) *Attorney, Agent, or Firm* — Womble Bond Dickinson (US) LLP

(57) ABSTRACT

Embodiments are described for dynamically spawning and/or decommissioning backup proxy nodes in a virtual infrastructure. A backup server can include a polling agent that polls the virtual infrastructure to determine a list of virtual machines whose data is to be backed up, and a list if virtual proxy nodes that facilitate backups of virtual machine data. A proxy map can be generated that describes the mapping of virtual machines to backup proxy nodes in the virtual infrastructure. Rules can be applied to the proxy map to determine whether a new proxy node should be spawned or an existing proxy node should be decommissioned. A new virtual proxy can be generated by accessing a database of preconfigured template virtual proxies to quickly generate the new virtual proxy. One or more virtual machines can be remapped to the newly created virtual proxy to ensure optimal throughput of backup data.

18 Claims, 11 Drawing Sheets

(56) References Cited

U.S. PATENT DOCUMENTS

| | | | |
|---|---|---|---|
| 2007/0226547 A1* | 9/2007 | Takata | G06F 3/0611 714/48 |
| 2012/0027134 A1* | 2/2012 | Gladwin | H04L 1/0045 375/340 |
| 2012/0072763 A1* | 3/2012 | Lu | G06F 17/30171 714/2 |
| 2012/0317274 A1* | 12/2012 | Richter | G06Q 10/06 709/224 |
| 2013/0007088 A1* | 1/2013 | Alfredo | G06F 9/5066 709/201 |
| 2013/0067088 A1* | 3/2013 | Kern | H04L 63/0407 709/226 |
| 2014/0123123 A1* | 5/2014 | Bahls | G06F 8/65 717/170 |
| 2014/0331277 A1* | 11/2014 | Frascadore | H04L 63/20 726/1 |
| 2015/0177984 A1* | 6/2015 | Idei | G06F 3/061 711/114 |
| 2015/0341244 A1* | 11/2015 | Cuni | H04L 41/142 709/224 |
| 2016/0077925 A1* | 3/2016 | Tekade | G06F 11/1456 707/654 |
| 2016/0094401 A1* | 3/2016 | Anwar | G06F 11/3006 709/223 |

* cited by examiner

US 10,642,633 B1

INTELLIGENT BACKUPS WITH DYNAMIC PROXY IN VIRTUALIZED ENVIRONMENT

TECHNICAL FIELD

This disclosure relates to the field of backing up data from a virtual machine to a backup server.

BACKGROUND

A virtual machine in a virtual computing infrastructure can run on a host device that comprises physical hardware and virtualization software. One or more applications that can run within the virtual machine can generate data that may be stored on one or more virtual disks. The process of backing up a virtual machine, or one or more data sets of a virtual machine, can burden the performance of the virtual machine. To reduce the performance burden of backing up a virtual machine or data set, a backup of a virtual machine or data set can be off-loaded to a backup proxy node. A backup proxy node can be a virtual proxy node on a proxy server or a physical proxy node, such as a backup proxy server. A backup proxy node can also be a virtual proxy node on a host computer that hosts virtual machines that may be backed up using the virtual proxy node. A virtual proxy node is a virtual machine configured to facilitate backup functionality in a virtual environment.

In the prior art, one or more virtual machines or data sets are statically mapped to a particular backup proxy node and the particular backup proxy node facilitates the backup of the virtual machine(s) or data set(s) mapped to the particular backup proxy node. Each of the virtual machines or data sets to be backed up by the backup proxy node must serially share the backup proxy node. Thus, the window of time that a backup can be performed for each of the virtual machines or data sets mapped to the particular backup proxy node is determined by the work load assigned (mapped) to the particular backup proxy node. The work load is the sum of the backup times for each of the virtual machines and data sets that are backed up by the particular backup proxy node. For example, for a backup proxy node that backups three virtual machines in 6 hours for each virtual machine and also backups data sets for each of a Microsoft® Exchange application, a Sharepoint® application and a SQL Server application in 8 hours each, has a minimum backup window of 3×6 hours plus 3×8 hours is 42 hours. If a backup service level agreement requires that these virtual machines and data sets must be backed up every 36 hours, then the backup proxy node cannot meet the requirements of the service level agreement. To meet the requirements of the service level agreement, a new proxy node must be manually created, and one or more of the virtual machines and/or application data sets must be mapped to the newly created backup proxy node.

In a dynamic virtual environment, where virtual machines are constantly added, moved, and deleted, and wherein application data sets continually grow and shrink, it is very difficult to manually configure, deploy, and map new backup proxy nodes to ensure that backup service level agreement requirements are met. Further, existing backup proxy nodes must be monitored to ensure that the proxy nodes are kept current with respect to the operating system(s) and/or applications and data sets that are to be backed up. In addition, if a host decommissions one or more virtual machines or application data sets, there may be more proxy nodes allocated than are actually needed to optimally back up the virtual machines and data sets, thereby wasting computational resources of the backup proxy server or host computer hosting the virtual proxy nodes.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
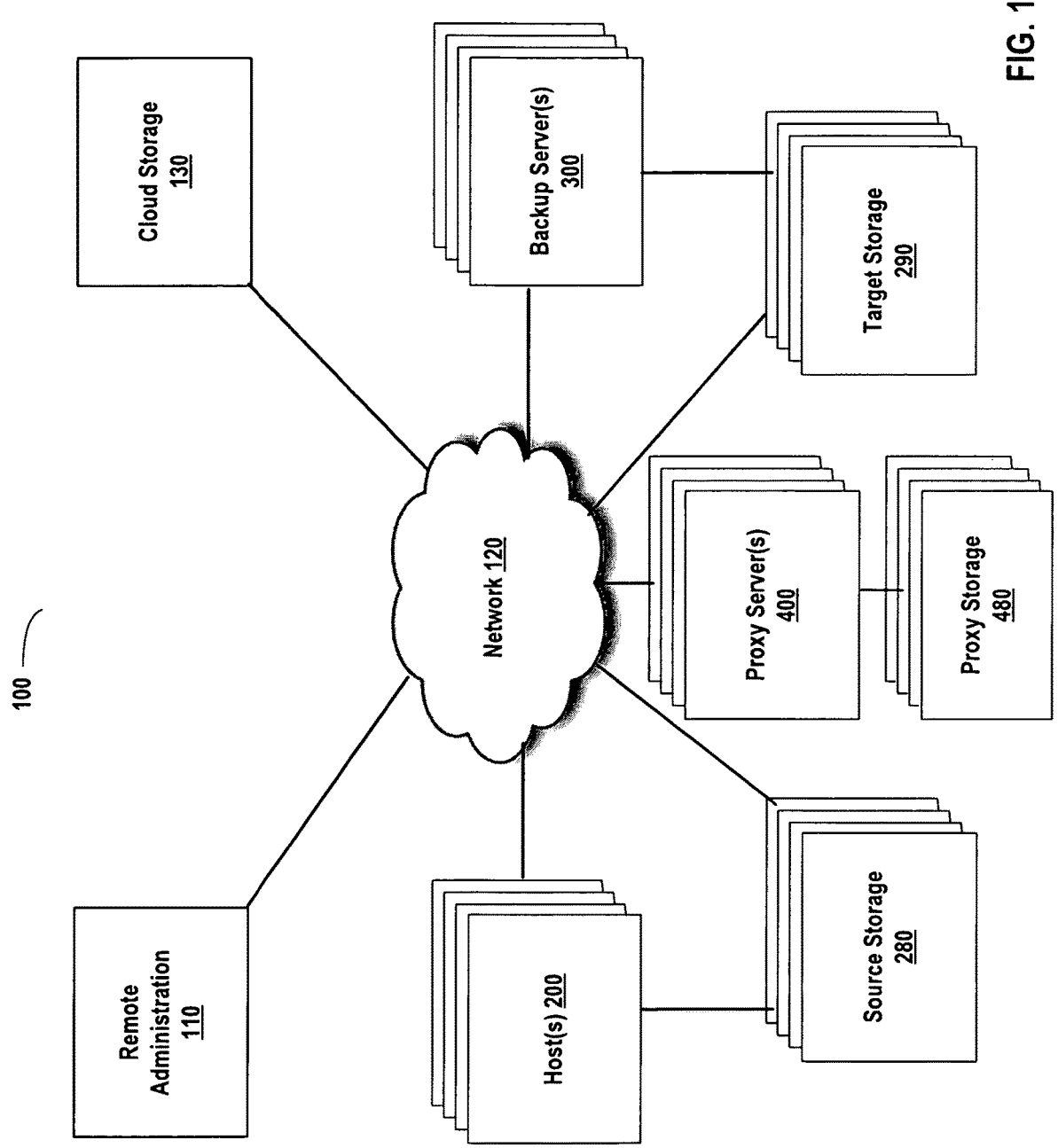
FIG. 1 illustrates, in block diagram form, an overview of a virtual infrastructure for backing up and restoring one or more virtual disks of a virtual machine in accordance with some embodiments.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for dynamically spawning and/or decommissioning virtual backup proxy nodes (or, "proxy node") in a virtual infrastructure. A backup server can include a polling agent that polls the virtual infrastructure to determine a list of virtual machines whose data is to be backed up, and a list if virtual proxy nodes that facilitate backups of virtual machine data. A configurator can generate a proxy map that describes the mapping of virtual machines to virtual backup proxy nodes in the virtual infrastructure. The configurator can apply rules to the proxy map to determine whether a new proxy node should be spawned (created) or an existing proxy node should be decommissioned (destroyed, decallocated, and resources recovered). The configurator can utilize performance monitoring information to determine whether a mapping of virtual machines to virtual proxies is optimally performing backup processes. If a new proxy node needs to be generated to increase throughput of the backup processes, the configurator can access a database of preconfigured template virtual proxies to quickly generate a new proxy node. Configurator can them remap one or more virtual machines to the newly created proxy node to ensure optimal throughput of backup processes. One or more new proxy nodes can be spawned to enhance fault tolerance of backup processes. Configurator can also determine whether resources can be recovered by decommissioning a proxy node.

In an embodiment, one or more proxy nodes can be generated on a host computing system that hosts virtual machines that generate the data to be backed up by the proxy nodes. In an embodiment, proxy nodes can be generated on a proxy server. The proxy server can be coupled to a proxy storage. Proxy storage can store a snapshot (a quiesced copy) of an image of a virtual machine, or one or more data sets of a virtual machine. In an embodiment, the snapshot is stored as a collection of disk blocks rather than as stream of bytes. The proxy storage can include a backup agent that facilitates communication with a source storage having the data to be backed up, and with a target storage where the data to be backed up is to be transferred and stored.

Any of the above methods can be embodied on a non-transitory computer-readable medium programmed with executable instructions that, when executed, perform the method. A system can be programmed with executable instructions that, when executed by a processing system that includes at least one hardware processor, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

FIG. 1 illustrates, in block diagram form, an overview of a virtual infrastructure 100 for backing up or restoring one or more virtual disks of a virtual machine accordance with some embodiments.

A virtual infrastructure 100 can include one or more host devices 200 and one or more storage appliances 280 and 290, one or more proxy servers 400 having proxy storage 480, coupled to a network 120 and one or more backup servers 300 coupled to the network 120. A remote administration module 110 can also be coupled to one or more hosts 200, the storage appliance(s) 280, and the backup server 300 via network 120. Hosts 200, storage appliance(s) 280 and 290, proxy servers 400, proxy storage 480, backup servers 300, and remote administration module 110 can also be coupled to a one or more cloud storage services 130. Host(s) 200 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of host(s) 200 may be a primary storage system (e.g., local data center) that provides storage to other local clients, which may periodically back up the content stored therein to a backup storage system (e.g., a disaster recovery site or system), such as storage system 300. Network 120 may be any type of networks such as a local area network (LAN), a wide area network (WAN) such as the Internet, a fiber network, a storage network, or a combination thereof, wired or wireless.

Host 200 can backup or restore one or more virtual disks of a virtual machine on the host 200 to or from the backup server 300. Backup server 300 can, in turn, opt to store all or a portion of the backup data of the one or more applications to cloud storage 130 or to target storage 290. The virtual disks can map to one or more physical disk drives. The one or more physical disk drives can be located within host 200. In an embodiment, a virtual disk can map to a network attached storage (NAS) across network 120 such as source storage 280 ("storage appliance"). A storage appliance 280 can comprise a large number of disks, such as EMC® VMAX 400K with up to 5,760 hard drives. In an embodiment, one or more storage appliances 280 can form a part of a host 200. In an embodiment, a virtual disk can be a raw virtual disk mapped to a one or more portions of storage. A portion of storage can comprise one or more logical unit numbers (LUNs) of a single physical disk or one or more physical disks in a storage appliance 280. In an embodiment, a raw disk can be configured to use virtual mapping to one or portions of storage, such that the portions of storage can be snapshot before a backup. In an embodiment, a raw virtual disk can be physically mapped to one or more portions of storage.

A backup of a virtual disk on a virtual machine on host 200 can be initiated by a user of the virtual machine on host 200. In an embodiment, a remote administrator 110 can initiate a backup or restore of a virtual disk of a virtual machine on host 200. In an embodiment, scheduled backups can be initiated by backup server 300. Backup server 300 can initiate a backup or restore of virtual disk on a virtual machine on host 200 in accordance with one or more backup policies associated with host 200 or associated with a virtual machine on host 200. In an embodiment, a backup policy can be application-specific. For example, a policy for a virtual machine on host 200 can be that a full backup of a Sharepoint® database is performed every Friday evening.

Figure 2:
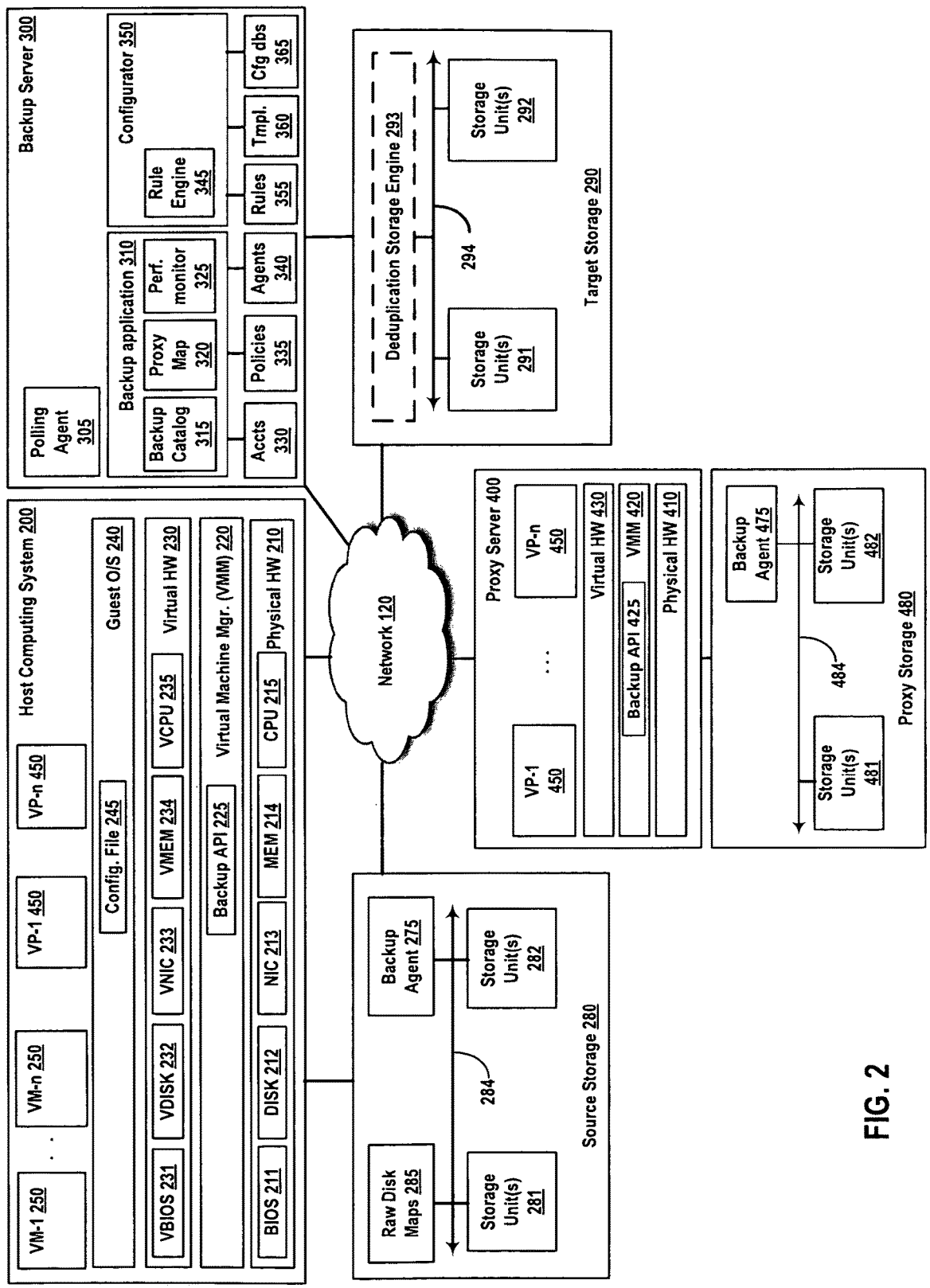
FIG. 2 illustrates, in block diagram form, a detailed view of a virtual infrastructure for backup up and restoring one or more virtual disks, virtual machine images, or data sets, in accordance with some embodiments.

FIG. 2 illustrates, in block diagram form, a detailed view of a virtual infrastructure 100 for backing up or restoring one or more virtual disks or data sets of a virtual machine (VM) 250 in accordance with some embodiments.

A virtual infrastructure 100 can include one or more host computing systems 200 ("host"), a backup server 300, a proxy server 400, a source storage 280, a target storage 290, and a proxy storage 480. In an embodiment, these components can be communicatively interconnected via network 120.

Network 120 can be any type of network such as a local area network (LAN), a wide area network (WAN) such as Internet, a corporate intranet, a metropolitan area network (MAN), a storage area network (SAN), a bus, or a combination thereof, wired and/or wireless.

Host 200 can include physical hardware 210, a virtual machine manager (VMM) 220, virtual hardware 230, a guest operating system 240, one or more virtual machines (VM) 250, and one or more virtual proxy nodes (VP) 450.

Physical hardware 210 can include a physical basic input-output system (BIOS) 211, one or more physical disks or storage devices 212, one or more network interface cards (NIC) 213, memory 214, and one or more processors or CPUs 215. Host 200 can be implemented in accordance with the computing system described with reference to FIG. 10, below.

Host 200 can include virtualization machine manager (VMM) 220 that provides a virtualization abstraction layer to support one or more virtual machines (VMs) 250 on host 200. VMM 220 can include a backup application programming interface (API) 225 that can access information within VMs 250, within operating system 240, and within host 200 that may be needed to perform a backup or restore of a virtual machine 250, of data generated by a virtual machine 250, or of one or more virtual disks 232. In an embodiment, backup API 225 can communicate with polling agent 305, backup application 310, and configurator 350 via network 120. Backup API 225 can be used to perform an image backup or restore of an entire virtual machine 250. In an embodiment, backup API 225 can communicate with a backup agent 275 within a source storage 280. Backup API 225 can communicate with a VM 250, virtual proxy (VP) 450, guest OS 240, virtual hardware 230, or physical hardware 210 via interprocess communication, such as messaging, shared memory, sockets, application programming interface (API) calls, or other communication methods.

Host 200 can further include virtual hardware 230 that can correspond to physical hardware 210, such as a virtual BIOS 231, one or more virtual storage devices (VDISK) 232, one or more virtual network interface cards (VNIC) 233, virtual memory 234, and one or more virtual processors or CPUs 235.

In an embodiment, a virtual BIOS 231 identifier within the virtual hardware 230 can provide a portion of a globally unique identifier (UUID) for virtual machine 250 for purposes of performing the functionality described herein. In an embodiment, a virtual machine 250 UUID can be persistent with a particular virtual machine 250, even if the virtual machine 250 is moved ("migrated") to a different client device 200.

Host 200 can also include one or more guest operating systems (OS) 240. Configuration file 245 can reside within guest OS 240. Configuration file 245 can store information that can be used by VMM 220 to implement each virtual machine 250, such as a name of each VM 250, a unique identifier of each VM 250, a size of storage used to implement the VM 250 and/or data sets generated by applications on the VM 250. Configuration file 245 can also store a list of the virtual disks 232 that are accessible by a particular VM 250. Configuration file 245 can further include filenames and file properties of one or more files in a virtual file system for a VM 250. Configuration file 245 can further include a name of a raw disk mapping file that maps a virtual disk 232 to a raw disk on source storage 280.

In an embodiment, host 200 can further include a storage manager or storage controller (not shown) configured to manage storage resources of host 200, such as, for example, storage space and processing resources (e.g., processor, memory, network resources). The storage manager or controller may be accessed by an administrator of management console or server 110 (as shown in FIG. 1) remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Source storage 280 can include any type of server or cluster of servers. For example, source storage 280 may be a storage server used for any of various different purposes, such as to provide multiple users with access to shared data and/or to back up mission critical data. Source storage 280 may be, for example, a file server (e.g., an appliance used to provide NAS capability), a block-based storage server (e.g., used to provide SAN capability), a unified storage device (e.g., one which combines NAS and SAN capabilities), a near-line storage device, a direct attached storage (DAS) device, or essentially any other type of data storage device. Source storage 280 may have a distributed architecture, or all of its components may be integrated into a single unit. Source storage 280 may be implemented as part of a source storage available from EMC® Corporation of Hopkinton, Mass., such as the EMC® VMAX family of storage appliances.

Source storage 280 can contain backup logic, or "backup agent" 275 that manages both backup and restore processes within the source storage 280. Backup agent 275 can communicate with backup API 225 in VMM 220 of host computing system 200. Backup agent 275 can further communicate with backup application 310 on backup server 300 to perform operations that implement backup of data from source storage 280 to target storage 290, or operations to restore data from target storage 290 to source storage 280. Source storage 280 can also contain virtual machine disk files that are the content files of the VMs 250. Source storage 280 can include, e.g. storage unit(s) 281-282. Storage units 281-282 may be implemented locally (e.g., single node operating environment) or remotely (e.g., multi-node operating environment) via interconnect 284, which may be a bus and/or a network. In one embodiment, one of the storage units 281-282 can operate as an active storage to receive and store external or fresh user data, while the other storage unit operates as a target storage unit to periodically archive data from the active storage unit according to an archiving policy or scheme. Storage units 281-282 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 281-282 may also be combinations of such devices. In the case of disk storage media, the storage units 281-282 may be organized into one or more volumes of Redundant Array of Inexpensive Disks (RAID). Note that a source storage of a client may also be called the primary storage of the client to distinguish the storage from backup source storages.

Source storage 280 can further includes raw disk mapping files 285 that map a virtual disk 232 of a virtual machine to one or more portions of storage on the source storage 280. A portion of a source storage 280 can be a logical unit number (LUN). Raw disk mapping to one or more portions of storage can be physical mapping or a virtual mapping. Source storage 280 can be coupled to backup server 300 and/or target storage 290 via network 120.

Target storage 290 can be coupled to backup server 300 either as direct attached storage (DAS) or as network attached storage (NAS) via network 120. Target storage 290 may include any type of server or cluster of servers. For example, target storage 290 may be a storage server used for any of various different purposes, such as to provide multiple users with access to shared data and/or to back up mission critical data. Target storage 290 may be, for example, a file server (e.g., an appliance used to provide NAS capability), a block-based storage server (e.g., used to provide SAN capability), a unified storage device (e.g., one which combines NAS and SAN capabilities), a near-line storage device, a direct attached storage (DAS) device, a tape backup device, or essentially any other type of data storage device. Target storage 290 may have a distributed architecture, or all of its components may be integrated into a single unit. Target storage 290 may be implemented as part of an archive and/or backup storage system such as a de-duplication storage system available from EMC® Corporation of Hopkinton, Mass.

Target storage 290 can include, but is not limited to, deduplication storage engine 293, and one or more storage units 291-292 communicatively coupled to each other. Storage units 291-292 may be implemented locally (e.g., single node operating environment) or remotely (e.g., multi-node operating environment) via interconnect 294, which may be a bus and/or a network. In one embodiment, one of the storage units 291-292 operates as an active storage to receive and store external or fresh user data, while the other storage unit operates as a target storage unit to periodically archive data from the active storage unit according to an archiving policy or scheme. Storage units 291-292 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 291-292 may also be combinations of such devices. In the case of disk storage media, the storage units 291-292 may be organized into one or more volumes of Redundant Array of Inexpensive Disks (RAID). Note that in one embodiment, backup server 300 and target storage 290 are integrated into one single system.

In response to a data file to be stored in storage units 291-292, optional deduplication storage engine 293 is configured to segment the data file into multiple segments according to a variety of segmentation policies or rules. Deduplication storage engine 293 only stores a segment in a storage unit if the segment has not been previously stored in the storage unit. In the event that a segment has been previously stored, metadata stores information enabling the reconstruction of a file using the previously stored segment. As a result, segments of data files are stored in a deduplicated manner, either within each of storage units 291-292 or across at least some of storage units 291-292. Data stored in the storage units 291-292 may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

Backup of a virtual machine (VM) 250 on host 200 can be performed using a virtual proxy node (VP) 450 on host 200 to facilitate the backup of the virtual machine storage or one or more data sets of the VM 250. Backup server 300 can instruct VP 450 to cause a snapshot to be taken of the virtual machine storage of VM 250, or one or more data sets of the VM 250. The snapshot can then be backed up from source storage 280 to target storage 290. Backup server 300 can facilitate the backup of the snapshot to the target storage 290.

Alternatively, backup of virtual storage of VM 250 or one or more data sets of a VM 250 on host 200 can be performed using a VP 450 on a proxy server 400 to facilitate the backup. Proxy server 400 can be implemented using a computing system such as the computing system described with reference to FIG. 10, below.

Proxy server 400 can include physical hardware 410, a virtual machine manager (VMM) 420, virtual hardware 430, and one or more virtual proxy nodes (VP) 450. Like host 200, physical hardware 410 of proxy server 400 can include a BIOS, one or more storage devices, one or more network interface cards, memory, and one or more processors.

VMM 420 can include a backup application programming interface (API) 425 that can access information within VPs 450, VMM 420, and within proxy server 400 that may be needed to perform a backup of a snapshot of virtual storage stored on proxy storage 480. In an embodiment, backup API 425 can communicate with polling agent 305, backup application 310, and configurator 350 via network 120. In an embodiment, backup API 425 can communicate with a backup agent 275 within a source storage 280. Backup API 425 can communicate with a virtual proxy (VP) 450, virtual hardware 430, or physical hardware 410 via interprocess communication, such as messaging, shared memory, sockets, application programming interface (API) calls, or other communication methods.

Proxy server 400 can further include virtual hardware 430 that can correspond to physical hardware 410, such as a virtual BIOS, one or more virtual storage devices (VDISK), one or more virtual network interface cards (VNIC), virtual memory, and one or more virtual processors.

In an embodiment, a virtual BIOS identifier within the virtual hardware 430 can provide a portion of a globally unique identifier (UUID) for virtual proxy 450 for purposes of performing backup functionality described herein. In an embodiment, a UUID can be persistent with a particular virtual proxy 450, even if the virtual proxy 450 is moved ("migrated") to a different proxy server 400 or host 200.

Backup server 300 can instruct VP 450 on proxy server 400 to take a snapshot of the virtual machine storage of VM 250, or one or more data sets of the VM 250. In an embodiment, the snapshot can be taken by the source storage 280, transferred to proxy server 400, and stored on proxy storage 480 for backup. By storing the snapshot on proxy storage 480, VM 250 can perform other work while proxy server 400 backups up the snapshot to target storage 290. In an embodiment, proxy server 400 can be located either physically close to source storage 280 and/or can be coupled to source storage 280 via a high speed network to facilitate fast transfer of the snapshot from the source storage 280 to proxy storage 480. In an embodiment wherein the snapshot is transferred from source storage 280 to proxy storage 480, the snapshot can then be backed up from proxy storage 480 to target storage 290. In an embodiment wherein VP 450 is generated on the same host 200 as the VM 250 to be backed up, and no intermediate proxy server 400 is used, then the snapshot can be taken on source storage 280. The snapshot can then be backed up from source storage 280 to target storage 290. The backup server 300 can facilitate backup of the snapshot to target storage 290. In an embodiment, backup agent 275 on source storage 280 can be called by backup server 300 via calls to VMM 220 backup API 225 to facilitate direct transfer of the snapshot from source storage 280 to target storage 290. In an embodiment, backup agent 475 on proxy storage 480 can be called by backup server 300 via calls to VMM 420 API 425 to facilitate direct transfer of the snapshot from proxy storage 480 to target storage 290.

Proxy storage 480 can include any type of server or cluster of servers. For example, proxy storage 480 may be a storage server used for any of various different purposes, such as to provide multiple users with access to shared data and/or to back up mission critical data. Proxy storage 480 may be, for example, a file server (e.g., an appliance used to provide NAS capability), a block-based storage server (e.g., used to provide SAN capability), a unified storage device (e.g., one which combines NAS and SAN capabilities), a near-line storage device, a direct attached storage (DAS) device, or essentially any other type of data storage device. Proxy storage 480 may have a distributed architecture, or all of its components may be integrated into a single unit. Proxy storage 480 may be implemented as part of a source storage available from EMC® Corporation of Hopkinton, Mass., such as the EMC® VMAX family of storage appliances.

Proxy storage 480 can contain backup logic, or "backup agent" 475 that manages both backup and restore processes within the proxy storage 480. Backup agent 475 can communicate with backup API 425 in VMM 420 of proxy server 400. Backup agent 475 can further communicate with backup application 310 on backup server 300 to perform operations that implement backup of data from proxy storage 480 to target storage 290. Proxy storage 480 can also contain VM disk files that are the content files of the VMs. Source storage can include, e.g. storage unit(s) 481-482. Storage units 481-482 may be implemented locally (e.g., single node operating environment) or remotely (e.g., multi-node operating environment) via interconnect 484, which may be a bus and/or a network. In one embodiment, one of the storage units 481-482 can operate as an active storage to receive and store external or fresh user data, while the other storage unit operates as a target storage unit to periodically archive data from the active storage unit according to an archiving policy or scheme. Storage units 481-482 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 481-482 may also be combinations of such devices. In the case of disk storage media, the storage units 481-482 may be organized into one or more volumes of Redundant Array of Inexpensive Disks (RAID). Note that a source storage of a client may also be called the primary storage of the client to distinguish the storage from backup source storages.

Proxy storage 480 can be coupled to host 200, backup server 300, proxy server 400, source storage 280, and/or target storage 290 via network 120.

Backup server 300 can be a computing system as described with reference to FIG. 10, below. Backup server 300 can comprise one or more computing systems. Backup server 300 can include, but is not limited to, a polling agent 305, a backup application 310, and a configurator 350. Backup application 310 can contain a backup catalog 315, a proxy map 320, and a performance monitor 325. Backup catalog 315 can contain information about the files that are backed up, such as file attributes, file name, access control information, and information about layout of the files or blocks within a disk snapshot. Metadata files also backed up can include a raw disk mapping file 285 that maps a virtual disk to one or more portions of storage, e.g. LUNs of a source storage. Proxy map 320 can describe the mapping of VMs 250 to virtual proxy nodes 450, and the location (host 200 or proxy server 400) of the proxy nodes. Performance monitor 325 can monitor performance characteristics of a backup in progress such as a data transfer rate for a particular backup, e.g. between a source storage 280 and target storage 290, or a proxy storage 480 and a target storage 290. Performance monitor 325 can communicate with target storage 290 to determine whether a data storage rate is being affected by deduplication or a network latency of network 120. Performance monitor 325 can also call VMM 220 API 275 to call backup agent 275 on source storage 280 to determine a rate at which storage blocks are queued for transfer from the source storage 280 to the proxy storage 480, or from source storage 280 to target storage 290. Configurator 350 can use the performance monitor 325 information to determine whether backup performance would be enhanced by dynamically spawning or decommissioning a virtual proxy node 450 for a backup. Configurator can also determine whether one or more VPs 450 can be decommissioned to free resources on host 200 and/or on proxy server 400.

Polling agent 305 can periodically poll VMM 220 of host 200 to determine the list the VMs 250 and virtual proxies 450 that are configured for host 200. Polling agent 305 can further poll VMM 420 of proxy server 400 to determine the VPs 450 that are configured for backing up VMs 250. Polling agent 305 can pass the list of VMs 250 and VPs 450 from host 200, and the list of VPs 450 from proxy server 400, to configurator 350. Configurator 350 can determined whether to spawn or decommission one or more VPs 450.

Configurator 350 can access a rules database 355 and a database of preconfigured virtual proxy node templates 360. Configurator 350 can receive periodically receive a list of configured VMs 250 and VPs 450 from polling agent 305 and can use rule engine 345 to apply rules 355 to determine whether to spawn or decommission one or more VPs 450. In an embodiment, configurator 350 can also use rule engine 345 to determine whether, and how, to remap VMs 250 to VPs 450 to optimize backup throughput, minimize load on host 200 resources, and optimize utilization of proxy server 400 resources. Configurator can apply rules 355 periodically, such as in response to polling agent 305 obtaining new or changed information. In an embodiment, configurator 350 can analyze performance monitor information 325, and/or polling agent 305 information, at any time, periodically, or upon detection of a triggering event such as low throughput, on request backup server 300, e.g. to ensure that the backup server meets a service level agreement requirement, or at a periodic interval that can be the same or different from the polling agent 305 polling interval.

Rules 355 can include rules for spawning a new VP 450, rules for decommissioning a VP 450, and rules for remapping VMs 250 to VPs 450. Configurator 350 can utilize rule engine 345 to apply rules to information from polling agent 305, proxy map 320, and performance monitor 325 to make decisions about whether to spawn or decommission a VP 450. During a backup, performance monitor 325 can provide a transfer rate of the snapshot of the backup data to target storage 290. A rule can determine that backup throughput would be improved by spawning a new VP 450 and mapping the backup of VM 250 to the new VP 450 to reduce wait time by increasing parallelism of backups. A rule can determine that a new VP 450 should be spawned to increase fault tolerance, such as when only a single VP 450 is currently configured for performing backups, because failure of the configured VP 450 would stop a backup in progress until a new VP 450 could be configured. A rule can indicate that a VP 450 is based on an operating system that is more than two revisions out of date. If so, then the VP 450 should be decommissioned and a new VP 450 spawned and mapped to take the place of the out of date VP 450. A rule can indicate that if the current VM-to-VP ratio is higher than a specified threshold, such as 20 VMs to 1 VP, that a new VP 450 should be spawned and VMs 250 should be remapped to redistribute the backup load of VMs 250 to the configured VPs 450. A rule can also indicate that a VP 450 that is more than one year old should be decommissioned and a new VP 450 spawned to replace the old VP 450. A new VP can also be spawned in response to configurator 350 analyzing data provided by polling agent 305 and performance monitor 325 to determine that a service level agreement (SLA) defining a requirement for a specified time window to backup data will not be met unless an additional VP 450 is generated to increase backup throughput.

After making spawning, decommissioning, and/or remapping decisions, configurator 350 can store the decisions in a configuration database 365.

Templates 360 can include preconfigured virtual proxy nodes 450 templates for quickly spawning a new VP 450 on host 200 or proxy server 400. A VP 450 can be preconfigured for a particular operating system. In an embodiment, a VP 450 can be preconfigured for a particular federated application such as SQL Server, Microsoft® Exchange, or Sharepoint®. Configurator 350 can access the template database 360, and call host VMM 220 via backup API 225 or proxy server VMM 420 via backup API 425 to quickly bring up the new VP 450.

Backup server 300 can coordinate with source storage 280, proxy server 400, proxy storage 480, target storage 290, and host computing system 200 to run various backup operations. Backup application 310 may perform both backup and restore functions. Backup application 310 can communicate with backup API 225 within VMM 220 of a host 200 having a virtual machine 250 to be backed up. Backup application 310 can also communicate with backup agent 275 in source storage 280 to run various operations. Backup application 310 can read and write backup accounts 320, backup policies 330, and backup agents 340. Accounts 330, policies 335, and agents 340 can reside on a single storage device accessible to backup server 300, or across multiple storage devices accessible to backup server 300.

Backup accounts 330 can include login information to backup server 300 for users of virtual machines 250 and administrators who may access backup server 300 via remote administration module 110. Accounts 330 can be aggregated by company, by region, or other metric, such that backup policies 335 can be generated for one or more backup accounts 330 by company, by region, or other metric, such as by data center or business operating group.

Backup policies 335 can specify particular applications or virtual disks whose data gets backed up from one or more virtual machines 250, retention policy for the backed up data, whether the backups are incremental, full, image, or an alternating or interleaved combination of these. Backup policies 335 can further define whether data is deduplicated before storage, how quickly the storage can be retrieved for access by a virtual machine, and other policy parameters.

Backup agents 340 can include modules that can perform general backup and restore functions and can additionally include modules that can perform specific functionality such as backing up or restoring a raw virtual disk or backing up data for a particular application. A VMM 220 can request an updated version of its own backup API 225. A backup agent 275 of a source storage 280 can request an updated version of itself before performing a backup or restore operation. Similarly, proxy server VMM 420 can request an updated version of its own backup API 425. Proxy storage backup agent 475 can also request an updated version of itself before performing backup functionality.

Backup catalogs 350 can be generated at backup or restore time to indicate the data that was backed up from, or restored to, a particular virtual machine 250. In addition, backup catalogs 350 can be updated if a status, location, or other relevant fact about a backup changes. For example, a policy 335 for a particular account may indicate that backups of all virtual machines for the account are to be retained for 30 days and, after the next backup, previous backups are to be moved to a lower tier storage such as tape. A policy may further indicate that after backups are 120 days old that the backups are to be erased. The backup catalogs 350 indicating the status of historic backups can be retained for an extended period of time. A policy 335 can determine how long backup catalogs 350 are retained.

Backup server 300 operating as a storage system may include or represent any type of servers or a cluster of one or more servers (e.g., cloud servers). For example, storage system 300 may be a storage server used for various different purposes, such as to provide multiple users or client systems with access to shared data and/or to back up (or restore) data (e.g., mission critical data). Storage system 300 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

Figure 3A:
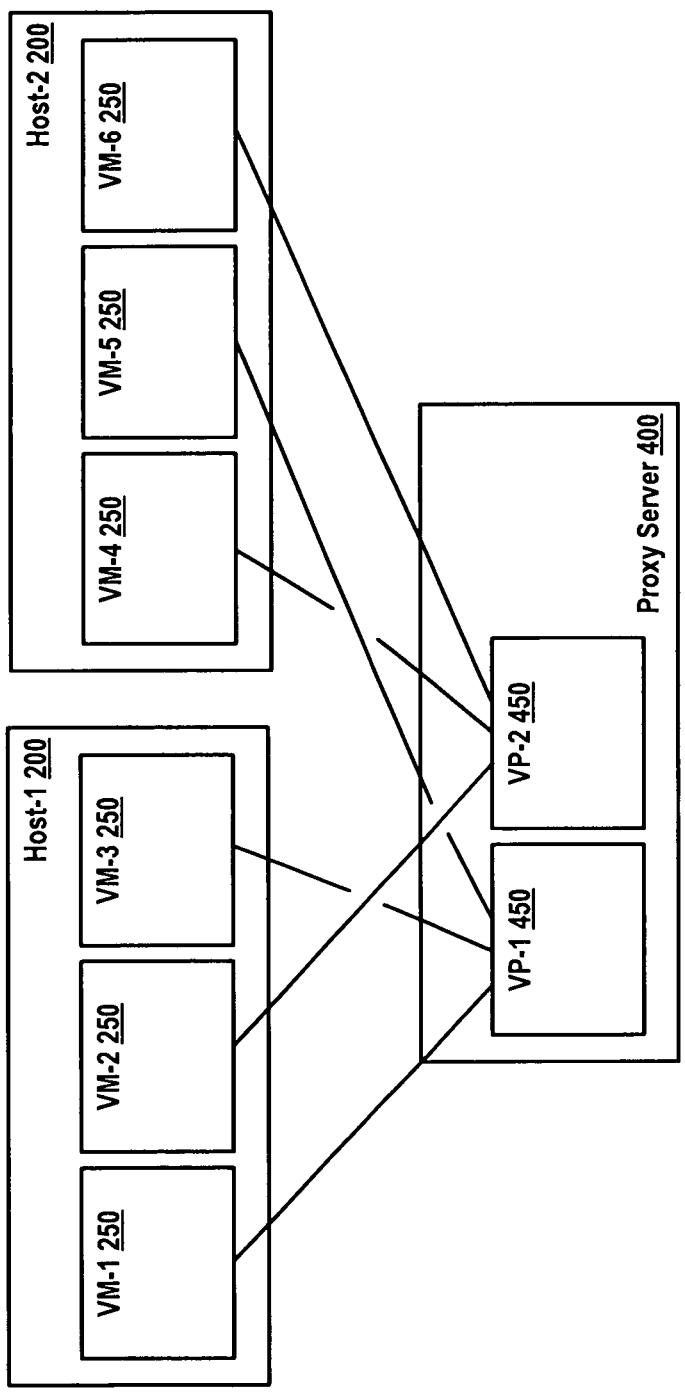
FIG. 3A illustrates a mapping of virtual machines to virtual backup proxies in a virtual infrastructure, according to some embodiments.

FIG. 3A illustrates a mapping of virtual machines 250 to virtual proxies 450 in a virtual infrastructure 100, according to some embodiments. In an example, Host-1 200 can include three example VMs 250, including VM-1, VM-2, and VM-3. Host-2 200 can include three example VMs 250, VM-4, VM-5, and VM-6. Proxy server 400 may have, e.g., two virtual proxies 450 configured: VP-1 and VP-2. VM-1, VM-3, and VM-5 may be mapped to VP-1 and VM-2, VM-4, and VM-6 may be mapped to VP-2.

Figure 3B:
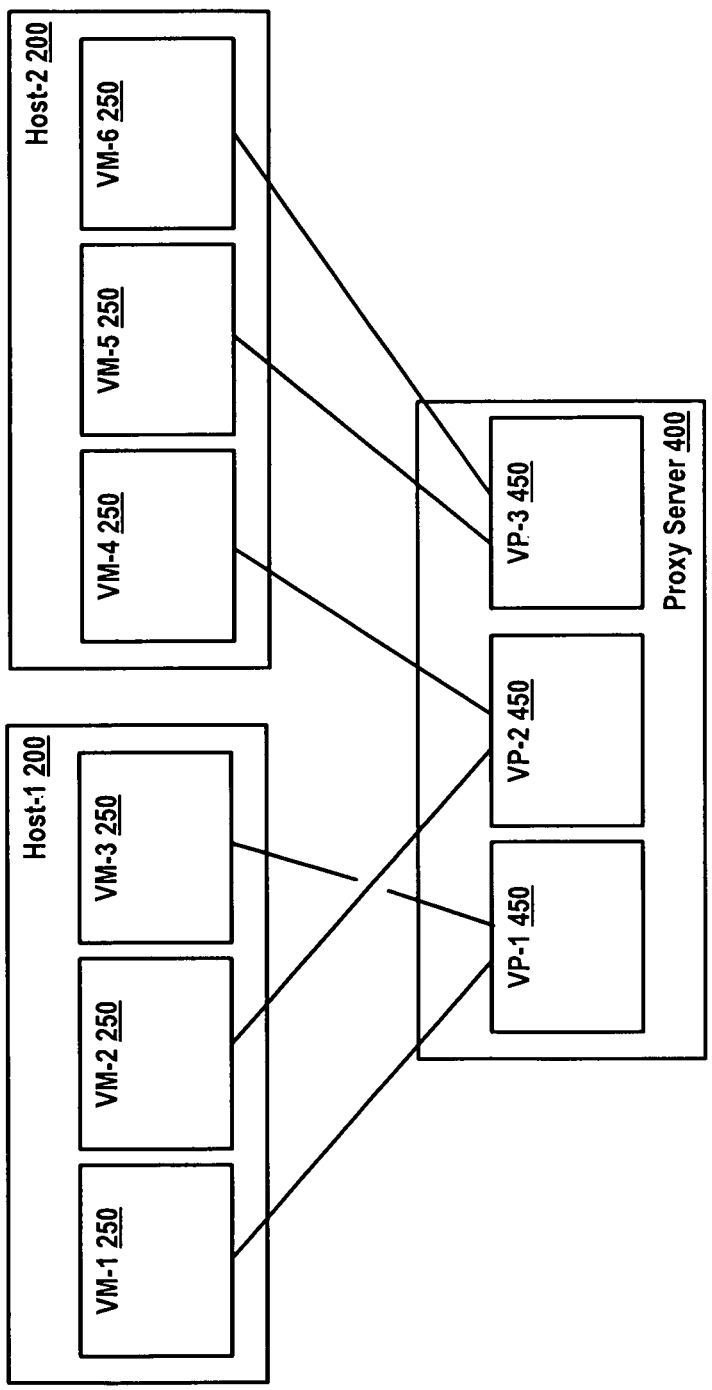
FIG. 3B illustrates generating a new virtual backup proxy and remapping virtual machines to virtual backup proxies according to some embodiments.

FIG. 3B illustrates generating a new virtual backup proxy VP-3 450 and remapping virtual machines 250 to virtual backup proxies VP-450 according to some embodiments. Configurator 350 can apply one or more rules to determine that a new VP 450 should be spawned, spawn the new VP 450 either on proxy server 400 or on host 200. In an embodiment, configuration 350 can then remap VMs 250 to VPs 450. In FIG. 3B, new VP-3 has been spawned. VM-5 has been remapped from VP-1 to VP-3. VM-6 has been remapped from VM-2 to VP-3. By spawning new VP-3 and remapping VMs 250 to VPs 450, parallelism and throughput have been increased. Although the example of FIGS. 3A and 3B shows VP-1 through VP-3 as hosted by proxy server 400, the VPs could also have been hosted by host 200, or split between host 200 and proxy server 400. In an embodiment, VP-1 through VP-3 can be hosted on more than one proxy server 400.

Figure 4:
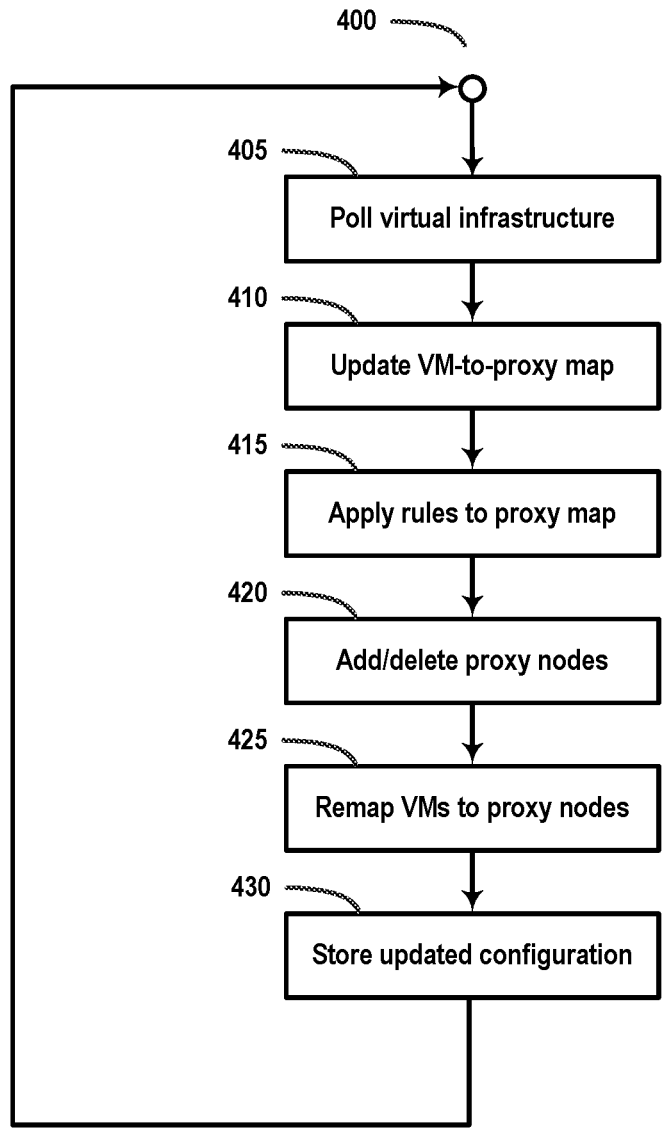
FIG. 4 illustrates a high level flow chart of a method of dynamically spawning and decommissioning virtual proxies and remapping virtual machines to virtual backup proxies according to some embodiments.

FIG. 4 illustrates a high level flow chart of a method 400 of dynamically spawning and decommissioning virtual proxies and remapping virtual machines to virtual proxies according to some embodiments.

In operation 405, a polling agent 305 can poll the virtual infrastructure to determine the configured virtual machines (VMs) 250 and virtual proxy nodes (VPs) 450 within the virtual infrastructure.

In operation 410, a configurator 350 can retrieve an existing proxy map 320 and receive configuration information from the polling agent 305. The configurator 350 can then generate an updated proxy map that indicates a mapping of virtual machines 250 to virtual proxy nodes 450 that can perform backup of the data of the mapped virtual machines 250.

In operation 415, a rule engine within the configurator 350 can apply one or more rules 355 to the updated proxy map 320. The rules 355 can determine whether a new VP 450 should be dynamically spawned (created). The rules 355 can further determine whether an existing VP 450 should be dynamically decommissioned (destroyed, deallocated, and resources recovered).

In operation 420, one or more VPs 450 can be dynamically spawned or decommissioned in accordance with the application of the rules 355 to the updated proxy map 320 in operation 415. In an embodiment, the configurator 350 also retrieves performance information from performance monitor 325. The configurator can use the performance monitor 325 information to assist in determining whether to dynamically spawn or decommission one or more virtual proxies 450. In an embodiment, configurator 350 can further access a database of policies 335 that can contain backup service level agreement requirements. The database of policies can further be considered in determining whether to dynamically spawn or decommission a VP 450.

In operation 425, one or more VMs 250 can be dynamically mapped to a new or different VP 450 after dynamically spawning and/or decommissioning one or more VPs 450.

In operation 430, the updated list of configured VMs 250, configured VPs 450, and the mapping of VMs 250 to VPs 450 can be stored by the configurator 350 in a configuration database 365.

Figure 5:
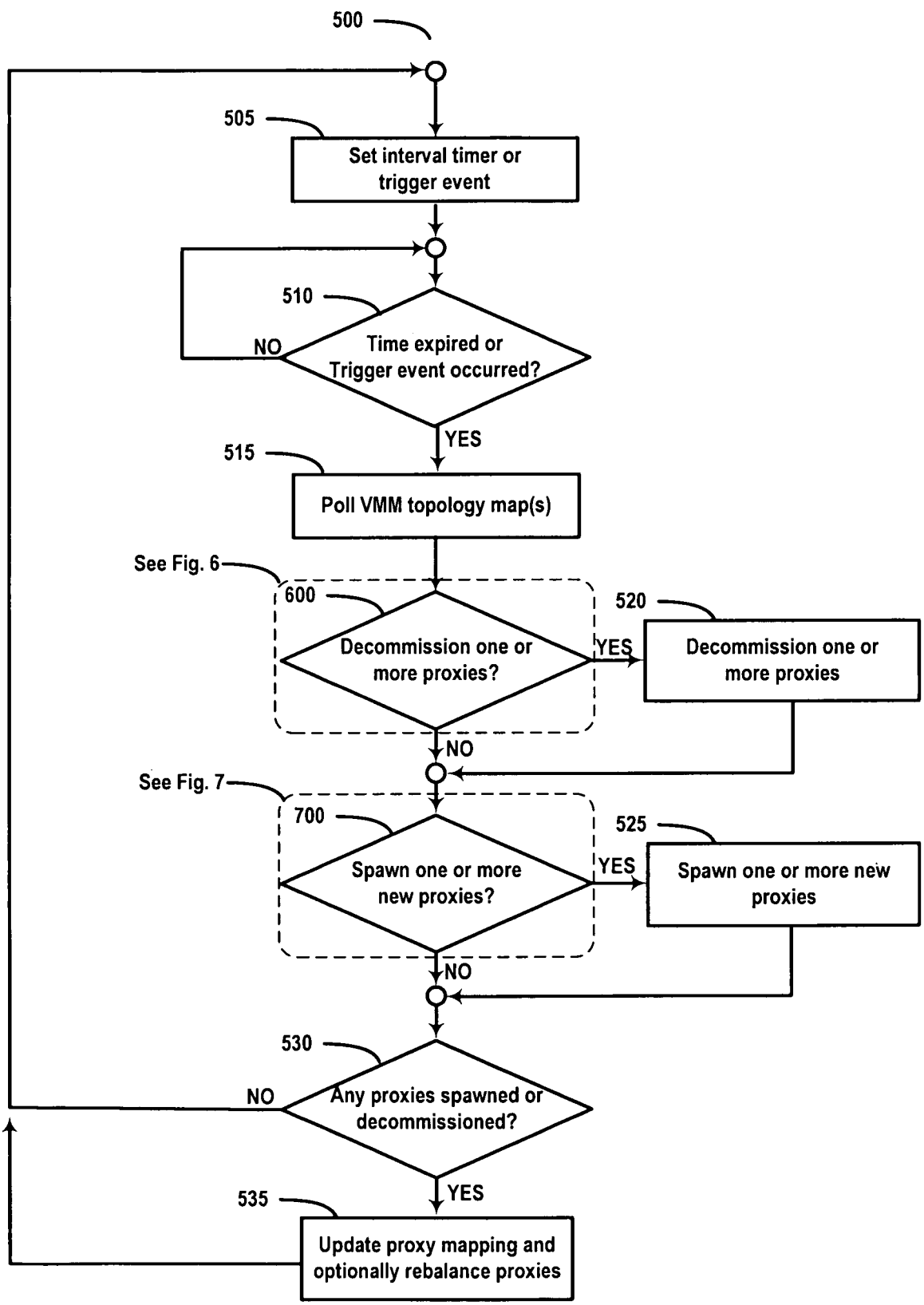
FIG. 5 illustrates a flow chart of a method of polling a virtual machine host to determine whether virtual backup proxies should be dynamically decommissioned or spawned according to some embodiments.

FIG. 5 illustrates a flow chart of a method 500 of polling a virtual machine host to determine whether virtual backup proxies 450 should be dynamically decommissioned or spawned according to some embodiments.

Figure 8:
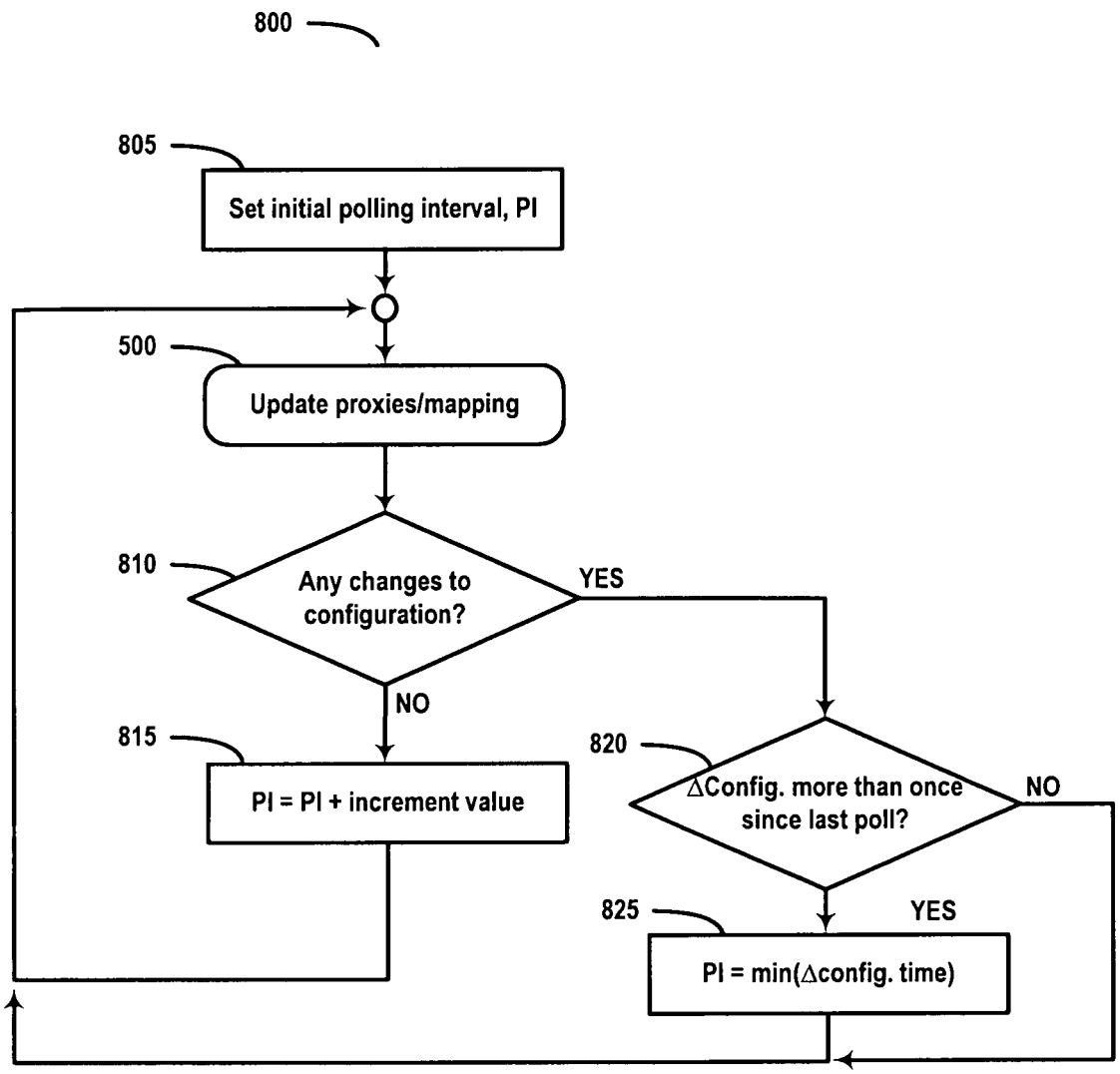
FIG. 8 illustrates a flow chart of a method of updating a polling interval for polling a virtual machine host to determine the virtual machines configured on the virtual machine host according to some embodiments.

In operation 505, a polling timer interval or triggering event can be set for the polling agent 305. At the expiration of the timer or on the happening of the triggering event, the polling agent will poll the VMMs 220 and optionally VM 420 to determine the configured VMs 250 and VPs 450 for backing up a VM 250. Polling interval timer can receive an initial value, such as every 30 minutes, 1 hour, or 4 hours. Polling interval value can also be dynamically modified as shown in FIG. 8, below. The polling interval can be shortened or lengthened to find a balance between spending resources to poll too often, and finding no changes, and polling too little and finding that the configuration of VMs 250 is changing more rapidly than the polling detects at the current interval. In an embodiment, polling can be triggered during a backup to determine whether addition of a VP 450 would increase throughput of the backups. In an embodiment, a triggering event can include performance monitor 325 detecting a substantial increase or decrease in backup throughput of one or more VPs 450. Backup server 300 backup catalog 315 can store historic data about the data volume and backup duration of previously performed backups. Backup application 310 can access policies 330 to determine when certain backups will be performed to meet their service level agreement requirements. Thus, in an embodiment, a triggering event can include determining that a threshold volume of data is to be backed up within a specified period of time. In an embodiment, a triggering event can include backup server 300 initiating a threshold number of backups, or initiating a threshold data volume of backups.

In operation 510, it can be determined whether the timer interval has expired or the triggering event has occurred. If not, then control loops back to operation 510. If the timer interval has expired or the triggering event has occurred, then the method resumes at operation 515.

In operation 515, polling agent 305 polls host 200 to determine the VMs 250 and VPs 450 that are configured for the host 200. Polling agent 305 can also poll the proxy server 400 to determine the VPs 450 configured for proxy server 400. The polling information can be passed to configurator 350.

In operation 600, it can be determined whether one or more VPs 450 should be decommissioned. If so, then in operation 520 one or more VPs 450 can be decommissioned. Operation 600 is described in further detail, below, with reference to FIG. 6. The method resumes at operation 700.

In operation 700, it can be determined whether one or more VPs 450 should be spawned. If so, then in operation 525 one or more new VPs 450 can be spawned. Operation 700 is described in further detail, below, with reference to FIG. 7. The method resumes at operation 530.

In operation 530, it can be determined whether any VPs 450 have been dynamically spawned or decommissioned. If so, then in operation 535, configurator 350 can remap the VMs 250 to the VPs 450 in accordance with rule engine 345 applying rules 355 to the configured VMs 250 and VPs 450. In an embodiment, performance monitor information 325 can additionally be considered by rule engine 345 to determine mapping of VMs 250 to VPs 450.

The method resumes at operation 505.

Figure 6:
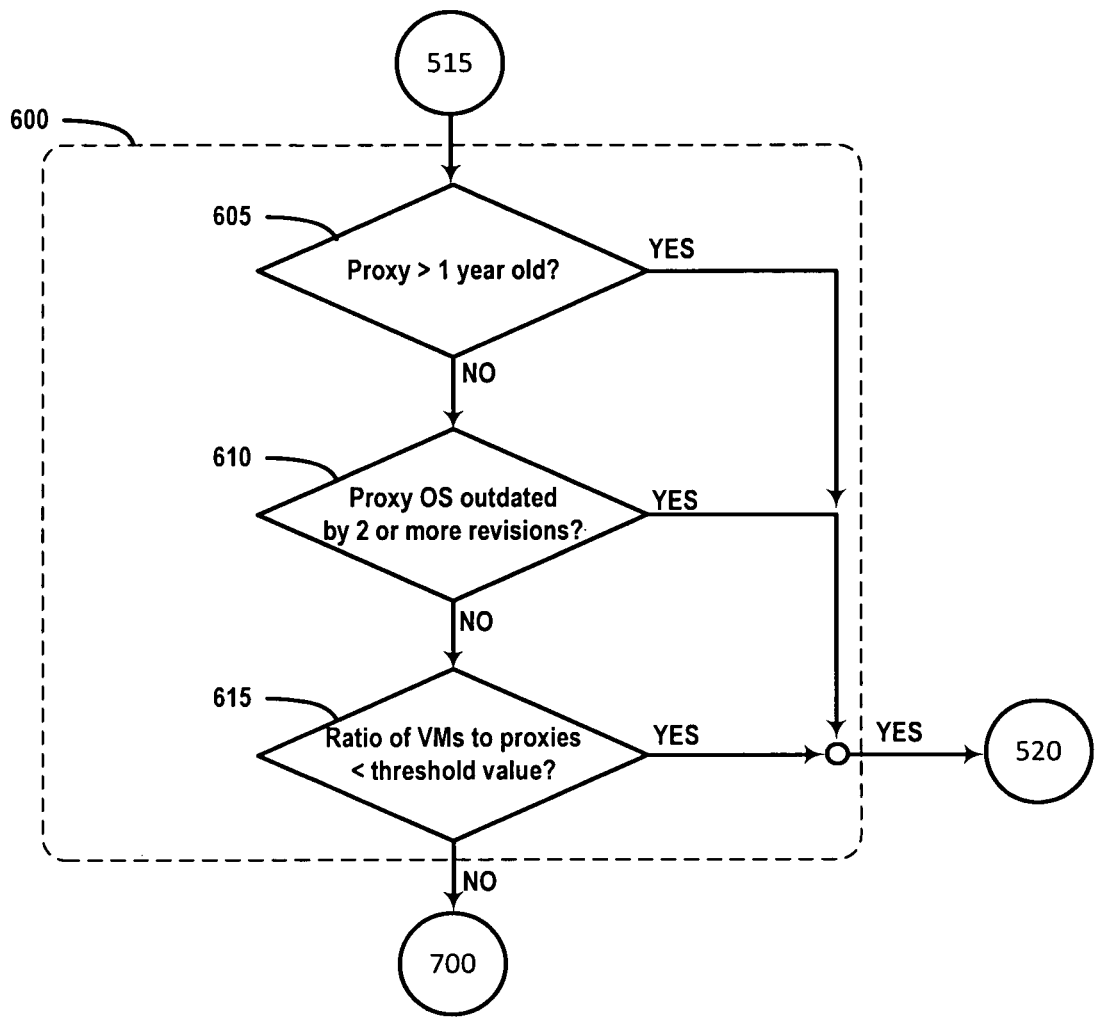
FIG. 6 illustrates a flow chart of a method that applies rules for decommissioning of a virtual backup proxy according to some embodiments.

FIG. 6 illustrates a flow chart of a method 600 that applies rules 355 for dynamically decommissioning of a backup proxy according to some embodiments. The method 600 illustrates application of several rules 355 for decommissioning of a virtual proxy 450. The rules 355 are to be considered illustrative and not limiting. Method 600 is entered from operation 515 of method 500. Method 600 ends by returning to method 500 at either operation 520 indicating that "Yes" a VP450 is to be dynamically decommissioned, or method 600 ends by returning to method 500 at operation 700 indicating that "No" a VM 450 is not to be dynamically decommissioned.

In operation 605, it can be determined whether a VP 450 is older than a threshold value of time, e.g. one year. If so, then "Yes" the VP 450 can be dynamically decommissioned and the method 600 continues at operation 610. In the case of a VP 450 being dynamically decommissioned due to being older than a threshold value of time, a new VP 450 may be dynamically spawned in method 500 operation 700 if is determined that a new VP 450 is needed.

In operation 610, it can be determined whether a VP 450 uses an operating system (OS) that is outdated by more than two revisions. If so, then "Yes" the VP 450 can be dynamically decommissioned, otherwise the method 600 continues at operation 615. In the case of a VP 450 being dynamically decommissioned due to being outdated, a new VP 450 may be dynamically spawned in method 500 operation 700, if is determined that a new VP 450 is needed.

In operation 615, it can be determined whether the ratio of VMs 250 mapped to VPs 450 is less than a threshold value, such as two. If so, then "Yes" one or more VPs 450 can be dynamically decommissioned, otherwise the method 600 ends at operation 700 of method 500.

Figure 7:
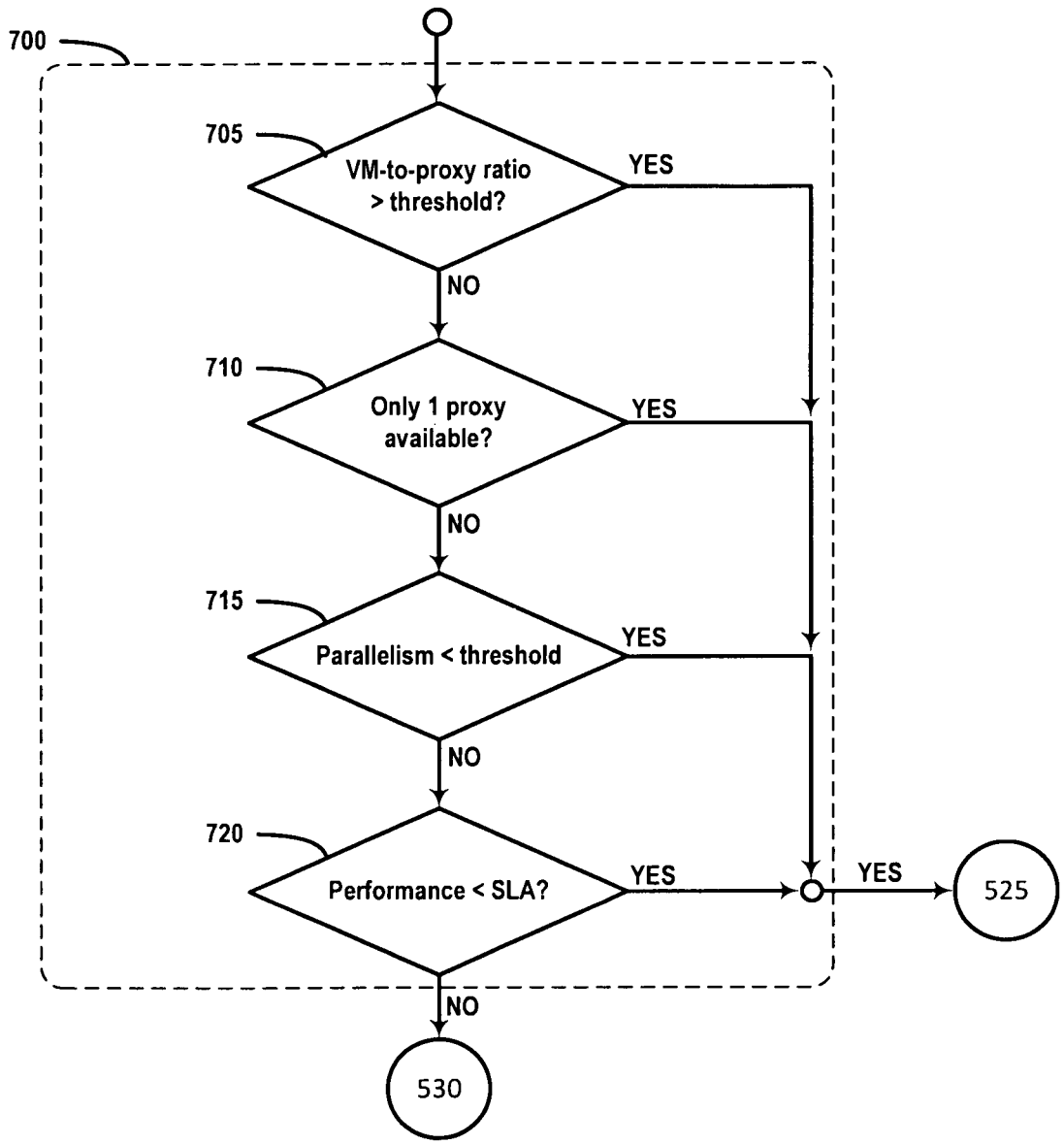
FIG. 7 illustrates a flow chart of a method that applies rules for dynamically spawning a new virtual backup proxy according to some embodiments.

FIG. 7 illustrates a flow chart of a method 700 that applies rules for dynamically spawning a new VP 450 according to some embodiments. Method 700 illustrates application of several rules for dynamically spawning a new virtual proxy (VP) 450. The rules are to be considered illustrative and not limiting. Method 700 is entered from method 500, either from operation 520 or from operation 600. Method 700 ends by returning to method 500 at either operation 525 indicating that "Yes" a VP 450 is to be dynamically spawned, or method 700 ends by returning to method 500 at operation 530 indicating that "No" a VM 450 is not to be dynamically spawned.

In operation 705 it can be determined whether a VM 250 to VP 450 mapping ratio is greater than a threshold value, such as 20 VMs 250 to 1 VP 450. If so, then "Yes" a new VP 450 can be dynamically spawned, otherwise the method continues at operation 710.

In operation 710, it can be determined whether there is only one VP 450 to perform backups (i.e. no spare VP 450 is configured). In this state, backups using a virtual proxy 450 are not fault tolerant because if the one configured VP 450 fails, the backup must be halted while a new VP 450 is dynamically configured and spawned. In an embodiment, detection of lack of fault tolerance can be performed before a backup has started. In an embodiment, detection of lack of fault tolerance can occur during a backup. If there is only one VP 450 available, then "Yes" a new VP 450 is to be dynamically spawned, otherwise the method continues at operation 715.

In operation 715, it can be determined whether there is insufficient parallelism of VPs 450 in a backup system, e.g. such as less than 4 parallel VPs 450 are configured. Lack of parallelism of VPs 450 occurs when too few VPs 450 are configured to service a number of VMs 250, and thus too many VMs 250 are mapped to VPs 450. The result of lack of parallelism is that the VMs 250 are backed up serially through the available VPs 450. This can add substantial time to backing up VMs 250 and their data sets. If there is insufficient parallelism of VPs 450, then "yes" a new VP 450 can be dynamically spawned, otherwise the method continues at operation 720.

In operation 720, it can be determined whether a current measure of performance indicates that one or more backups will not get performed within the time window required by a service level agreement. If so, then "Yes" a new VP 450 can be dynamically spawned, otherwise the method ends at operation 530.

FIG. 8 illustrates a flow chart of a method 800 of updating a polling interval for polling a virtual machine host 200 and proxy server 400 to determine the virtual machines 250 and virtual proxies 450 configured on the virtual machine host 200 and on proxy server 400 according to some embodiments.

In operation 805, an initial polling interval, "PI", for polling agent 305 can be set. The initial polling interval can be selected by a system administrator. The initial polling interval can be, e.g., every 30 minutes, every 1 hour, or every 4 hours, or other value. In an embodiment, performance monitor 325 can keep statistics as to how long each backup runs through VP 450, how often configuration of VMs 250 or VPs 450 occur, and other system configuration changes that configurator 350 will take into account when determining whether to dynamically configure VPs 450. In an embodiment, the initial polling value can be shorter than the one half (½) of the shortest window of time in which all data sets are backed up for any VM 250 configured for VP 450.

In operation 500, polling agent 305 polls VMM 220 of host 200 and polls VMM 420 of proxy server 400 to determine the configured VMs 250 and VPs 450 in the virtual infrastructure 100. Operation 500 is described in detail with reference to FIG. 5, above.

In operation 810, it can be determined whether operation 500 resulted in any changes such as dynamically spawned or decommissioned VMs 250 and/or dynamically spawned, decommissioned, or failed VPs 450-occurred. If so, then the method continues at operation 820, otherwise the method continues at operation 815.

In operation 815, no configuration changes occurred since the last polling by polling agent 305. Therefore the polling increment can be increased by an incremental value. The incremental value can be a specified percentage of the current polling increment, e.g. increase polling interval by 10%. In an embodiment, the polling interval can be increased by a fixed increment of time, such as 30 minutes or 1 hour. In an embodiment, the polling increment value can be zero, such the polling interval is unchanged when the virtual infrastructure (number of configured VMs 250 and VPs 450) is unchanged. Method 800 continues at operation 500.

In operation 820, changes occurred to the configuration of one or more VMs 250 and/or VPs 450. Configurator 350 keeps track of changes to the configuration of VMs 250 and VPs 450 in the virtual infrastructure 100 in configuration database 365. At operation 820, it can be determined whether a configuration change, Δconfig, occurred more than once during a polling interval. If so, then at least one configuration change was not captured by the polling agent 305 because the polling interval was too long to capture at least one of the multiple configuration changes.

If, in operation 820, it is determined that more than one configuration change, Δconfig, occurred during the polling interval, then in operation 825, the polling interval can be set to the minimum value of time between the multiple configuration changes that occurred during this polling interval. Otherwise, the polling interval can remain unchanged. The method 800 resumes at operation 500.

Figure 9:
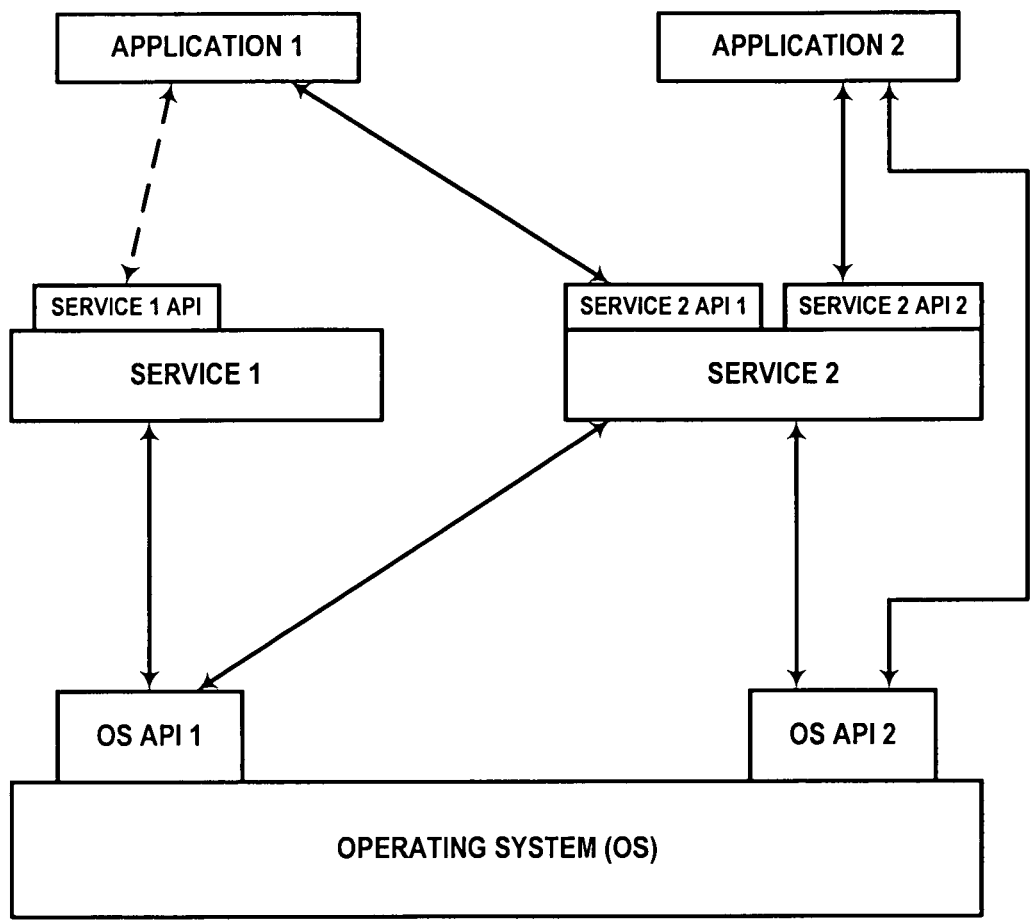
FIG. 9 illustrates an exemplary embodiment of a software stack usable in some embodiments of the invention.

In FIG. 9 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2

(which can be, for example, a software library) makes calls to and receives returned values from both as API 1 and OS API 2, Application 2 makes calls to and receives returned values from as API 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
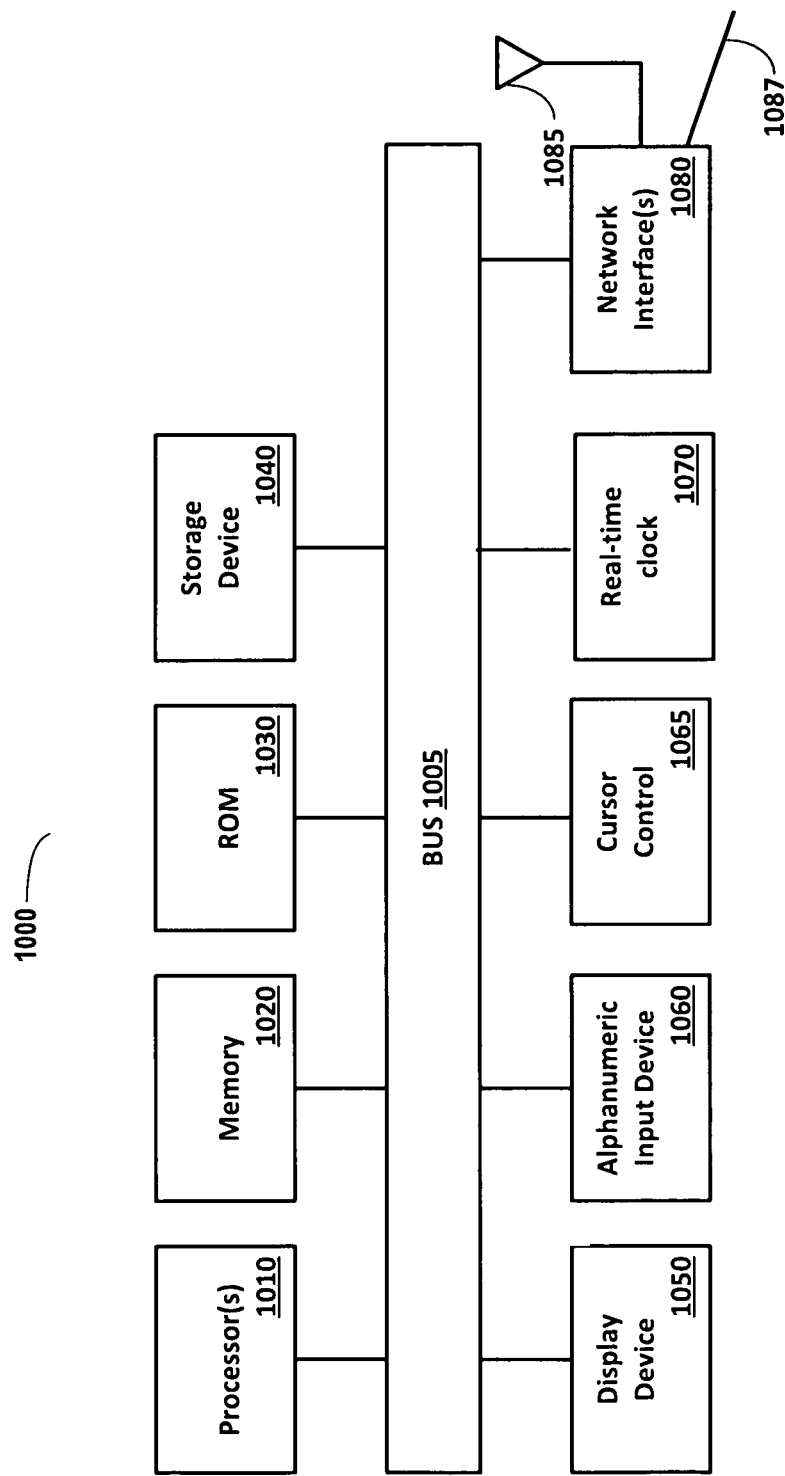
FIG. 10 illustrates, in block diagram form, an exemplary computing system for implementing concepts described herein.

FIG. 10 is a block diagram of one embodiment of a computing system 1000.

The computing system illustrated in FIG. 10 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 10 may be used to provide a computing device and/or a server device.

Computing system 1000 includes bus 1005 or other communication device to communicate information, and processor 1010 coupled to bus 1005 that may process information.

While computing system 1000 is illustrated with a single processor, computing system 1000 may include multiple processors and/or co-processors 1010. Computing system 1000 further may include random access memory (RAM) or other dynamic storage device 1020 (referred to as main memory), coupled to bus 1005 and may store information and instructions that may be executed by processor(s) 1010. Main memory 1020 may also be used to store temporary variables or other intermediate information during execution of instructions by processor 1010.

Computing system 1000 may also include read only memory (ROM) 1030 and/or other static, non-transitory storage device 1040 coupled to bus 1005 that may store static information and instructions for processor(s) 1010. Data storage device 1040 may be coupled to bus 1005 to store information and instructions. Data storage device 1040 such as flash memory or a magnetic disk or optical disc and corresponding drive may be coupled to computing system 1000.

Computing system 1000 may also be coupled via bus 1005 to display device 1050, such as a cathode ray tube (CRT), light-emitting diode display (LED), or liquid crystal display (LCD), to display information to a user. Computing system 1000 can also include an alphanumeric input device 1060, including alphanumeric and other keys, which may be coupled to bus 1005 to communicate information and command selections to processor(s) 1010. Another type of user input device is cursor control 1065, such as a touchpad, a mouse, a trackball, or cursor direction keys to communicate direction information and command selections to processor(s) 1010 and to control cursor movement on display 1050. Computing system 1000 may further include a real-time clock 1070. The real-time clock 1070 may be used for generating date/time stamps for data records, computing elapsed time, and other time-keeping functions. A real-time clock 1070 can be a battery-backed chipset with a settable date and time. Alternatively, a real-time clock 1070 may include logic to retrieve a real-time from a network source such as a server or an Internet server via network interfaces 1080, described below.

Computing system 1000 further may include one or more network interface(s) 1080 to provide access to a network, such as a local area network. Network interface(s) 1080 may include, for example, a wireless network interface having antenna 1085, which may represent one or more antenna(e). Computing system 1000 can include multiple wireless network interfaces such as a combination of WiFi, Bluetooth® and cellular telephony interfaces. Network interface(s) 1080 may also include, for example, a wired network interface to communicate with remote devices via network cable 1087, which may be, for example, an Ethernet cable, a coaxial cable, a fiber optic cable, a serial cable, or a parallel cable.

In one embodiment, network interface(s) 1080 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 1080 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method comprising:
setting a polling timer interval for initiating polling;
periodically polling a virtual machine host according to the polling timer interval to determine a plurality of virtual machines configured on the virtual machine host and attributes about each of the plurality of virtual machines, including at least one of a size of the virtual machine or a size of the data to be backed up for the virtual machine;
determining a number of backup proxies configured for backing up the data of each of the plurality of virtual machines on the virtual machine host and a mapping ratio of virtual machines to the number of backup proxies;
generating a new backup proxy based on the plurality of virtual machines and the number of backup proxies, in response to a rule in a set of one or more rules indicating that the mapping ratio of the plurality of virtual machines to backup proxies exceeds a threshold value, or only one backup proxy is configured for backing up the plurality of virtual machines;

automatically provisioning the new backup proxy based on a predetermined proxy template in response to the one or more rules indicating that the new backup proxy should be generated;
automatically, decommissioning one or more of the backup proxies in response to determining that a backup proxy is older than a threshold value of time, or a backup proxy uses an operating system that is outdated by a threshold number of revisions;
spawning a replacement backup proxy to replace each backup proxy decommissioned due to being old or outdated in response to determining that the replacement backup proxy is needed; and
in response to a change in the plurality of virtual machines, generation of one or more new backup proxies, or decommissioning of one or more old/outdated backup proxies, storing an updated list of the virtual machines and the backup proxies and an updated mapping of the virtual machines to the backup proxies in a configuration database; and
updating the polling timer interval by:
determining a configuration change occurred more than once during a last polling; and
decreasing the polling timer interval to a minimum time interval value between two configuration changes during the last polling, wherein the configuration change comprises the change in the plurality of virtual machines, generation of one or more backup proxies or decommissioning of one or more old/outdated backup proxies.

2. The method of claim 1, wherein polling the virtual machine host comprises calling an application programming interface to a virtual machine manager on the virtual machine host to receive a list of virtual machines configured on the virtual machine host.

3. The method of claim 1, further comprising:
analyzing the attributes of the plurality of virtual machines to be backed up, a mapping of the plurality of virtual machines to be backed up, and the backup proxies to determine at least one of: whether to add a new backup proxy or delete a backup proxy.

4. The method of claim 1, further comprising automatically remapping one or more of the plurality of virtual machines from one of the backup proxies to the new backup proxy.

5. The method of claim 1, wherein a rule indicates that the new backup proxy should be generated when there is insufficient parallelism in the backup system.

6. The method of claim 1, wherein a rule indicates that the new backup proxy should be generated when a backup of a particular virtual machine is forecast to take longer than is allowed by a backup service level agreement.

7. A non-transitory computer-readable medium programmed with executable instructions that, when executed by a processing system having at least one hardware processor; perform operations comprising:
setting a polling timer interval for initiating polling;
periodically polling a virtual machine host according to the polling timer interval to determine a plurality of virtual machines configured on the virtual machine host and attributes about each of the plurality of virtual machines, including at least one of size of the virtual machine or a size of the data to be backed up for the virtual machine;
determining a number of backup proxies configured for backing up the data of each of the plurality of virtual machines on the virtual machine host;
generating a new backup proxy based on the plurality of virtual machines and the number of backup proxies, in response to a rule in a set of one or more rules indicating that the mapping ratio of the plurality of virtual machines to backup proxies exceeds a threshold value, or only one backup proxy is configured for backing up the plurality of virtual machines;
automatically provisioning the new backup proxy based on a predetermined proxy template in response to the one or more rules indicating that the new backup proxy should be generated;
automatically decommissioning one or more of the backup proxies in response to determining that a backup proxy is older than a threshold value of time, or a backup proxy uses an operating system that is outdated by a threshold number of revisions;
spawning a replacement backup proxy to replace each backup proxy decommissioned due to being old or outdated in response to determining that the replacement backup proxy is needed;
in response to a change in the plurality of virtual machines, generation of one or more new backup proxies, or decommissioning of one or more old/outdated backup proxies, storing an updated list of the virtual machines and the backup proxies and an updated mapping of the virtual machines to the backup proxies in a configuration database; and
updating the polling timer interval by:
determining a configuration change occurred more than once during a last polling; and
decreasing the polling tinier interval to a minimum time interval value between two configuration changes during the last polling, wherein the configuration change comprises the change in the plurality of virtual machines, generation of one or more backup proxies or decommissioning of one or more old/outdated backup proxies.

8. The medium of claim 7, wherein polling the virtual machine host comprises calling an application programming interface to a virtual machine manager on the virtual machine host to receive a list of virtual machines configured on the virtual machine host.

9. The medium of claim 7, further comprising:
analyzing the attributes of the plurality of virtual machines to be backed up, a mapping of the plurality of virtual machines to be backed up, and the backup proxies to determine at least one of: whether to add a new backup proxy or delete a backup proxy.

10. The medium of claim 7, further comprising automatically remapping one or more of the plurality of virtual machines from one of the backup proxies to the new backup proxy.

11. The medium of claim 7, wherein a rule indicates that the new backup proxy should be generated when there is insufficient parallelism in the backup system.

12. The medium of claim 7, wherein a rule indicates that the new backup proxy should be generated when a backup of a particular virtual machine is forecast to take longer than is allowed by a backup service level agreement.

13. A system comprising:
a processing system having at least one hardware processor, the processing system coupled to a memory programmed with executable instructions that, when executed by the processing system, perform operations comprising:

setting a polling timer interval for initiating polling;
periodically polling a virtual machine host according to the polling timer interval to determine a plurality of virtual machines configured on the virtual machine host and attributes about each of the plurality of virtual machines, including at least one of a size of the virtual machine or a size of the data to be backed up for the virtual machine;
determining a number of backup proxies configured for backing up the data of each of the plurality of virtual machines on the virtual machine host and a mapping ratio of virtual machines to the number of backup proxies;
generating a new backup proxy based on the plurality of virtual machines and the number of backup proxies, in response to a rule in a set of one or more rules indicating that the mapping ratio of the plurality of virtual machines to backup proxies exceeds a threshold value, or only one backup proxy is configured for backing up the plurality of virtual machines;
automatically provisioning the new backup proxy based on a predetermined proxy template in response to the one or more rules indicating that the new backup proxy should be generated;
automatically decommissioning one or more of the backup proxies in response to determining that a backup proxy is older than a threshold value of time, or a backup proxy uses an operating system that is outdated by a threshold number of revisions;
spawning a replacement backup proxy to replace each backup proxy decommissioned due to being old or outdated in response to determining that the replacement backup proxy is needed; and
in response to a change in the plurality of virtual machines, generation of one or more new backup proxies, or decommissioning of one or more old; outdated backup proxies, storing an updated list of the virtual machines and the backup proxies and an updated mapping of the virtual machines to the backup proxies in a configuration database; and
updating the polling, timer interval by:
determining a configuration change occurred more than once during a last polling; and
decreasing the polling timer interval to a minimum time interval value between two configuration changes during the last polling, wherein the configuration change comprises the change in the plurality of virtual machines, generation of one or more backup proxies or decommissioning of one or more old/outdated backup proxies.

14. The system of claim 13, wherein polling the virtual machine host comprises calling an application programming interface to a virtual machine manager on the virtual machine host to receive a list of virtual machines configured on the virtual machine host.

15. The system of claim 13, further comprising:
analyzing the attributes of the plurality of virtual machines to be backed up, a mapping of the plurality of virtual machines to be backed up, and the backup proxies to determine at least one of: whether to add a new backup proxy or delete a backup proxy.

16. The system of claim 13, further comprising automatically remapping one or more of the plurality of virtual machines from one of the backup proxies to the new backup proxy.

17. The system of claim 13, wherein a rule indicates that the new backup proxy should be generated when there is insufficient parallelism in the backup system.

18. The system of claim 13, wherein a rule indicates that the new backup proxy should be generated when a backup of a particular virtual machine is forecast to take longer than is allowed by a backup service level agreement.

* * * * *

UNITED STATES PATENT AND TRADEMARK OFFICE
CERTIFICATE OF CORRECTION

PATENT NO. : 10,642,633 B1  
APPLICATION NO. : 14/869787  
DATED : May 5, 2020  
INVENTOR(S) : Shelesh Chopra, Vladimir Mandic and Michael Jones Page 1 of 1

It is certified that error appears in the above-identified patent and that said Letters Patent is hereby corrected as shown below:

In the Claims

In Claim 7, Column 19, Line 56, delete "cessro;" and insert --cessor,--.

In Claim 7, Column 20, Line 33, delete "tinier" and insert --timer--.

In Claim 13, Column 21, Line 36-37, delete "old;outdated" and insert --old/outdated--.

Signed and Sealed this  
Fifth Day of January, 2021

Andrei Iancu  
*Director of the United States Patent and Trademark Office*